Patented June 29, 1943

2,323,218

UNITED STATES PATENT OFFICE 2,323,218

TAENIACIDE

James Erwin Guthrie, Ashland, Ohio, assignor to Dr. Hess & Clark, Inc., Ashland, Ohio, a corporation of Ohio No Drawing. Application October 13, 1941, Serial No. 414,889

4 Claims. (Cl. 167—53.1)

This invention relates to taeniacides, particularly adapted for oral administration to poultry for the removal of cestodes and like infestations therefrom.

With this purpose in view the invention contemplates the use of certain tin salts prepared by the reaction of organic acids such as cis-transisomeric acids, maleic, or fumaric, and by the reaction of butyric acid with tin salts, the end products stannous maleate, stannous fumarate, and stannous butyrate having been found especially effective as taeniacides.

Tin in various forms has been used as a taeniacide and tin and certain tin salts when used in combination with synthetic pelletierine hydrochloride are very efficacious in removing cestodes and similar infestations from poultry.[1]

[1] American Journal of Veterinary Research, vol. 2, No. 2, Guthrie and Harwood.

Synthetic pelletierine is now unobtainable at a cost sufficiently low to permit administration to poultry, and a new and economically feasible medicament is needed for use in the poultry field. Many experiments have been made with mixtures of the commercially available tin salts and various amines but these compounds have proven to be ineffective or unstable.

I have discovered that the tin salts of maleic, fumaric, and butyric acids are very effective and since the chemicals from which the compounds are formed are of low cost and easily obtained these new compounds constitute an important forward step in the art.

In the following example for the preparation of stannous maleate and stannous fumarate the method is identical for both compounds.

Stannous chloride reacts in water with sodium fumarate and sodium maleate to form the respective compounds under the following circumstances:

1,250 grams of sodium maleate or sodium fumarate as the starting compound are dissolved in 1,500 cubic centimeters of water. In a separate container 1,759 grams of stannous chloride are dissolved in two liters of water which has been acidified by the addition of 100 cubic centimeters of concentrated hydrochloric acid. The solution of the starting compound is added slowly to the solution of stannous chloride. Such addition is made with constant and vigorous agitation of the stannous chloride solution. The time necessary for the addition of the starting compound solution to the stannous chloride is approximately five minutes.

The mixture reacts to form approximately 1,600 grams of the stannous salt, either stannous maleate or stannous fumarate, depending upon the starting compound, and may be separated from the supernatant fluid by filtration or other suitable means. A theoretical yield, using the above compounds and specified amounts, is 1,814 grams, but this can only be obtained by the addition of 200 grams of sodium hydroxide to the filtrate which precipitates an additional quantity of stannous maleate or stannous fumarate, thus making the yield practically quantitative.

The preparation of stannous butyrate is preferably as follows:

Sodium butyrate, in the desired quantity is dissolved in water in one vessel and the proper amount of tin chloride is also dissolved in water in a second vessel. The two solutions are then mixed by adding the sodium butyrate solution to the stannous chloride solution with vigorous agitation of the latter solution. The chemicals react to form stannous butyrate, but in order to secure a good yield thereof certain steps are necessary, and more specifically as follows:

In the formation of stannous butyrate 1,134 grams of sodium butyrate is dissolved in 1,500 cubic centimeters of water and in a second vessel 2,319 grams of stannous chloride are dissolved in 2,000 cubic centimeters of water. Theoretically, 1,160 grams of stannous chloride are required to unite with the mentioned quantity of sodium butyrate to make 1,504 grams of stannous butyrate. However, in this reaction large amounts of stannous butyrate remain in solution and to obtain a proper yield twice the theoretical quantity of stannous chloride is necessary.

The solution of stannous chloride is stirred by a mechanical agitator and the sodium butyrate solution added slowly by means of a dropping funnel. The reaction takes place at room temperature and approximately one hour is necessary to mix the two solutions. The stannous butyrate precipitates and may be separated by filtration from the mother liquor giving a yield of approximately 1,030 grams. As in the previous preparations, the addition of 200 grams of sodium hydroxide to the mother liquor precipitates an additional 116 grams more of stannous butyrate. The theoretical yield using the above compounds and quantities is 1,504 grams, the actual yield obtained being approximately 83 per cent of the theoretical.

My experiments have shown the effectiveness of stannous maleate and stannous fumarate for the removal of cestodes from poultry, certain results having been tabulated as follows:

Table No. 1

Controlled tests with stannous maleate and stannous fumarate for chickens [2] experimentally infected with *Raillietina cesticillus*.

[2] Each fowl used in these experiments was raised tapeworm free and was given 50 cysticercoids of *Raillietina cesticillus* approximately two weeks before treatment.

| Experiment No. | Birds in each group, number | Drug | Dose, grams | Tapeworms recovered at necropsy | Mean indicated efficacy of treatment, percent |
|---|---|---|---|---|---|
| 1 | 10 | Stannous fumarate | 1 | 14 | 92.39 |
|   | 10 | Stannous maleate | 1 | 7 | 96.19 |
|   | 10 | Controls Exp. 1, no treatment | | 184 | |
| 2 | 10 | Stannous fumarate | 0.75 | 46 | 68.4 |
|   | 10 | Stannous maleate | 0.5 | 50 | 65.7 |
|   | 10 | Controls Exp. 2, no treatment | | 146 | |
| 3 | 9 | Stannous fumarate | 1 | 92 | 67.6 |
|   | 9 | Stannous maleate | 1 | 34 | 88.3 |
|   | 10 | Controls Exp. 3, no treatment | | 284 | |
| 4 | 11 | Stannous maleate | 1 | 86 | 66.79 |
|   | 11 | Controls Exp. 4, no treatment | | 259 | |
| 5 | 11 | Stannous maleate | 1 | 8 | 96.91 |
|   | 11 | Controls Exp. 5, no treatment | | 259 | |

As may be seen from the above table, both stannous maleate and stannous fumarate are effective for the removal of tapeworms, where a dose of one gram is employed. In those tests in which both the fumarate and the maleate are employed the maleate seems to be slightly more effective and is therefore the preferred compound. In the recommended dosages of one gram neither of the compounds have any serious effect upon the health of the bird. Both produce a temporary catarrhal enteritis, from which recovery is very prompt. The minimum lethal dose appears to be 10 grams per bird giving a therapeutic index of approximately 10.

The dose for stannous butyrate is also one gram and has no serious effect upon the health of the bird. A temporary enteritis is also caused and the minimum lethal dose is again 10 grams. From the following table it will be seen that in doses of one gram stannous butyrate is from 82 to 99 per cent effective for the removal of infestations:

Table No. 2

Controlled tests with stannous butyrate for chickens [3] experimentally infected with *Raillietina cesticillus*.

[3] Each fowl used in these experiments was raised tapeworm free and was given 50 cysticercoids of *Raillietina cesticillus* approximately two weeks before treatment.

| Experiment No. | Birds in each group, number | Dose, grams | Tapeworms recovered at necropsy | Mean indicated efficacy of treatment, percent |
|---|---|---|---|---|
| 1 | 9 | 1 | 1 | 99.45 |
|   | 10 | Controls Exp. 1, no treatment | 184 | |
| 2 | 10 | 0.5 | 55 | 62.32 |
|   | 10 | Controls Exp. 2, no treatment | 146 | |
| 3 | 10 | 1 | 23 | 91.9 |
|   | 10 | Controls Exp. 3, no treatment | 284 | |
| 4 | 11 | 1 | 29 | 88.8 |
|   | 11 | Controls Exp. 4, no treatment | 259 | |
| 5 | 11 | 1 | 46 | 82.23 |
|   | 11 | Controls Exp. 5, no treatment | 259 | |

Tin compounds such as those outlined above may be given to chickens from almost any vehicle if a few simple precautions are followed. Dosage should not be made earlier than three hours after feeding and the birds must not be fed for at least three hours following treatment. Preferably the birds are treated in the evening three hours after they have gone to roost whereby they are disturbed as little as possible and may be fed at their usual times. In this way growth or production is not limited by an enforced fast.

Having thus described my invention what I claim is:

1. A taeniacide composition comprising a tin salt of the group consisting of stannous maleate, stannous fumarate, and stannous butyrate.

2. A taeniacide composition comprising stannous maleate.

3. A taeniacide composition comprising stannous fumarate.

4. A taeniacide composition comprising stannous butyrate.

JAMES E. GUTHRIE.